Nov. 11, 1958 C. A. CAMPBELL 2,860,327

BINARY-TO-BINARY DECIMAL CONVERTER

Filed April 27, 1956 2 Sheets-Sheet 1

INVENTOR.
Charles A. Campbell
BY Hyman Hurvitz
Attorney.

Nov. 11, 1958 C. A. CAMPBELL 2,860,327

BINARY-TO-BINARY DECIMAL CONVERTER

Filed April 27, 1956

2 Sheets-Sheet 2

INVENTOR.
Charles A. Campbell
BY [signature]
Attorney

United States Patent Office 2,860,327
Patented Nov. 11, 1958

2,860,327

BINARY-TO-BINARY DECIMAL CONVERTER

Charles A. Campbell, Melbourne, Fla.

Application April 27, 1956, Serial No. 581,192
12 Claims. (Cl. 340—347)

The present invention relates to systems for converting pulse groups representative of binary numbers to representations in a binary-decimal number system, and more particularly to systems for rapidly converting binary coded pulse groups into binary-decimal coded pulse groups.

It is an object of the present invention to provide a binary to binary-decimal converter utilizing a minimum number of basic circuit elements which may be multiplied to extend the range of numbers subject to conversion.

It is another object of the present invention to provide a binary to binary-decimal converter which may convert a binary number directly applied to the converter, or the sum of binary numbers sequentially applied to the converter, to the binary-decimal form of the number or the sum.

Still another object of the present invention is to provide a binary to binary-decimal converter utilizing false count insertion.

Yet another object of the present invention is to provide a binary to binary-decimal converter utilizing a conventional binary counter in which is inserted false counts to generate the conversion.

Another object of the present invention is to provide a binary to Gray code converter, which may be modified for use as a true binary to binary-decimal converter by the elimination of a small number of circuit elements.

Yet another object of the present invention is to provide a binary to binary-decimal converter, or binary to Gray code converter, wherein a count of six is added to each of an appropriate number of binary scalers and a count of six subtracted at the output of the scalers to reconvert the information to the original count.

It is another object of the present invention to provide a binary to binary-decimal converter utilizing groups of four binary scalers connected as conventional binary counters, in which is applied a false count of six by means of feedback in each group of four binary scalers to produce an output from the last scaler of each group of four to the first element of the next succeeding group of four at a count of ten rather than at a count of sixteen, and to subtract a count of six from the state of the binary scalers to reconvert the indication to the number originally applied to the converter.

In a true binary system representation of a number, the entire number is written in binary form, whereas in the binary-decimal system of number representation each digit of a number is converted to a separate binary number represented by a group of four bits. In accordance with the present invention, conversion of the binary to binary-decimal number is accomplished utilizing a conventional binary chain or chain of flip-flops. If the chain were utilized as a true binary counter, an output pulse would appear on the output from the fourth flip-flop of the chain upon the attainment of a count of sixteen and all of the flip-flops in the first group of four would be in the zero state, indicating a binary zero, whereas, the first flip-flop in the succeeding group of four would be in a state indicating a one. However, in a binary-decimal system an output pulse must derive from the fourth flip-flop in each group of four binary scalers upon the attainment of a count of ten, one hundred etc. rather than sixteen, one hundred and twenty-eight etc. In order to accomplish this objective in accordance with the principles of the present invention a count of six is added to the count applied to the input to each group of four binary scalers, so that an output pulse is obtained from the fourth unit of each scaler upon the attainment of a count of ten in the flip-flops. However, since the output representation for the units, tens and hundreds must be a true binary number, means is provided for subtracting the count of six from the condition represented by the binary scalers. Thus, when the number applied to the converter is nine, the binary scalers must read a count of fifteen so that upon the addition of a count of one, an output pulse will be applied to the decade group of binary scalers. However, since the count is truly nine and not fifteen, means are supplied for reducing the count represented by the counters by a count of six, so that the number fifteen in the scalers is reduced to the number nine in the units output of the converter. In accordance with the present invention, the flip-flop in the binary 8 position, or the fourth flip-flop in each group of four scalers, applies a feedback signal to the flip-flops in the binary 2 and 4 positions to add a count of six to the binary counter. The flip-flop in the binary 8 position also applies inhibiting voltages to the outputs of the flip-flops in the binary 2 and 4 positions, to subtract six from the state represented by the flip-flops, so that the true number applied to the input of the converter appears at its output. The converter is built up of a number of similar flip-flops, trigger circuits for driving the flip-flops, and cathode followers responsive to the outputs of the flip-flops for driving loads. Delay lines are appropriately connected in input and feedback leads where necessary to properly time the sequence of operations of the apparatus.

The converter of the present invention may be applied equally well for conversion of binary numbers to other code systems than the binary-decimal. The embodiment hereinabove described converts a binary number to a binary-decimal number, and therefore a count of six has to be added to the flip-flops and subtracted from their output. Conversion to other systems is possible by applying a different false count applied to the flip-flops, subtracting from the final state of the flip-flops the same false count.

In the system of the invention a binary number is applied to the system by feeding the individual pulses representing bits of information sequentially and successively to the various flip-flop stages of the apparatus, starting with the stage in the binary 128 position. In effect, the apparatus takes each pulse representing a bit and converts this to one or more pulses which are indicative of the binary-decimal number corresponding to the binary number represented by the input pulse. The value of each successive binary pulse supplied to the apparatus is added to the value of the preceding pulses until all pulses representing a binary number have been received and the final registration of the apparatus is indicative of the binary-decimal number represented by the binary number input.

As a specific example let it be assumed that the number 96 is to be applied to the register in an eight bit binary code. The number 96 is written 01100000 and thus during successive intervals the binary 128 stage will receive no pulse, the binary 64 stage will receive a pulse, the binary 32 stage will receive a pulse and the binary 16 through 1 stages will receive no pulses. The total, therefore, represented by the register will be 96, and will be designated in the binary-decimal form by 0110 in the first four places and 1001 in the second four places, thereby representing respectively the numbers 6 and 9 or if the register is read from right to left the number 96. The total in the register may be as high as 255 if pulses are applied to all stages sequentially starting with the binary 128 stage and concluding with the binary 1 stage. Thus, it is seen that the apparatus accepts binary coded information in serial-parallel form; being applied in series timewise and in parallel circuitwise, that is, each pulse appears in a discrete time interval for the serial effect and is applied to a distinct lead connected to a predetermined stage, thereby providing the parallel circuit arrangement.

It is, therefore, another object and feature of the present invention to provide a binary to binary-decimal converter which may be readily modified to provide conversion of a binary number to other well known binary coded forms.

It is still another object of the present invention to provide a binary to binary-decimal converter built up from a minimum number of different trigger circuits, flip flops and cathode followers.

It is another object of the present invention to provide a binary to binary-decimal converter which is equally applicable to conversion of a binary number to a Gray code by the addition of two cathode followers and a four input and-gate, each input of the and-gate being connected to receive control voltages from a different flip-flop in each scale of four binary counter.

The above and still further features, objects, and advantages of the invention will become apparent upon consideration of the following detailed description of a specific embodiment of the invention, especially when taken in conjunction with the accompanying drawings, wherein.

Figure 1:
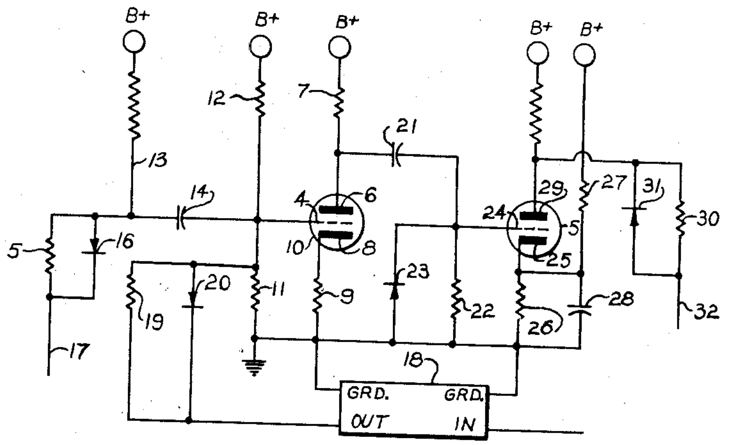
Figure 1 is a circuit diagram of a trigger circuit utilized in present invention.

The binary to binary-decimal converter of the present invention is built up from a plurality of three basic circuit elements, i. e. trigger circuits 1, flip-flops 2 and cathode follower drivers 3. Each trigger circuit 1, illustrated in Figure 1 of the accompanying drawings, is adapted to receive negative input pulses from any one of a plurality of sources and, to develop a negative output pulse which is applied to a flip-flop circuit 2, illustrated in Figure 2. The flip-flops are interconnected as a binary scaler chain, a negative pulse output of each flip-flop 2 being applied to a trigger circuit 1 associated with the next succeeding flip-flop 2. The third basic element employed in the present invention is a cathode follower driver 3, connected to receive a positive output pulse from an associated flip-flop 2, and adapted to produce an output signal in response to the output pulse.

The trigger circuit 1, illustrated in Figure 1, comprises cascaded triodes 4 and 5, the triode 4 having its plate 6 connected to a source of plate voltage through a resistor 7 and its cathode 8 connected to a source of reference potential, such as ground, through a resistor 9. A control grid, 10, is connected to the junction of resistors 11 and 12, in turn connected between the source of plate potential and the point of reference potential. Negative input pulses from a source of binary coded information (not illustrated) are applied to a lead 13, which is connected to the grid 10 of triode 4 through a coupling capacitor 14 which effectively differentiates the pulse and causes a negative voltage to be applied to the grid 10. The lead 13 is further connected through parallel resistor 15 and diode 16, to receive output pulses appearing on lead 17 from the preceding flip-flop 2 in the binary scaler chain, the diode 16 having its plate connected to the lead 13. Where desirable, as in the binary-decimal 4 and 40 trigger circuits of the present invention an additional source of negative pulses may be supplied through a delay line 18, the output of which is connected through a parallel circuit comprising a resistor 19 and diode 20 to the grid 10 of the tube 4, the diode 20 having its plate connected to the grid 10. The plate 6 of the triode 4 is connected to ground through series connected coupling capacitor 21 and grid bias resistor 22, the latter shunted by a diode 23 having its cathode connected to ground. The second triode 5 has its grid 24 connected to the junction of the capacitor 21 and resistor 22 and its cathode 25 connected to ground through a resistor 26. The cathode 25 is further connected to the junction of a resistor 27 and capacitor 28 which are connected between the source of plate voltage and ground, with one end of the resistor 27 connected to the source of plate voltage. The triode 5 is plate loaded, with plate 29 connected through a resistor 30 shunted by a diode 31 to an output lead 32, the diode 31 having its cathode connected to the plate 29 of the tube 5. The resistors 11 and 12 maintain a bias on the grid 10 of triode 4 which is positive with respect to its cathode 8, and therefore the triode 4 is normally conducting. The triode 5 is normally non-conducting because the cathode 25 is positive with respect to the control grid 24, in response to current flow through resistors 26 and 27. Upon the application of a negative impulse, to the grid 10 of triode 4 through any one of the input circuits previously described, the triode 4 is rendered non-conductive and applies a positive output pulse through the capacitor 21 to the grid 23 to render the tube 5 conductive. Conduction of the tube 5 causes its plate voltage to fall, thereby applying a negative pulse to the output lead 32. Each of the diodes 16, 20, 23, and 31 is included in each trigger circuit 1 to prevent spurious operation of its associated flip-flop 2 as a result of the application of positive input pulses to, or internally generated pulses in, the trigger circuit 1. The application of a positive pulse to the resistor 15-diode 16 circuit, connected through capacitor 14 to the grid 10 of triode 4, renders the diode 16 non-conductive, and the positive pulse is attenuated by the resistor 15. The positive pulse may not be sufficiently attenuated and therefore may produce some increase in conduction of the triode. Increased conduction of the triode 4 will apply a negative pulse through the capacitor 2 to the diode 23, which shunts the pulse to ground. Positive pulses appearing at the plate 29, due to transients in the line, block the diode 31 and the pulse must proceed through the resistor 30 where it is attenuated. The operation of the diodes 16, 23, and 31, therefore produce sufficient attenuation of a positive input pulse or internally generated pulses to prevent a positive output pulse from reaching sufficient amplitude to actuate the bi-stable flip-flops 2. The output lead 32 in the trigger circuit 1 is connected through a coupling capacitor 33, illustrated as part of the flip-flop circuit 2 in Figure 2. The capacitor 33 is connected through diodes 34 and 35 to grids 36 and 37 of the A and B sections respectively of a dual triode 38 which comprise the switch tubes of the flip-flop 2. The diodes 34 and 35 have their cathodes connected to the capacitor 33 so as to pass negative pulses and block positive pulses appearing on the lead 32. The grid 36 of the triode 38A is connected to the junction of resistors 39 and 40, connected in a series circuit comprising resistors 39, 40 and 41, the resistor 41 having one end connected to a source of plate potential and the resistor 39 having one end connected to a source of reference potential, such as ground. Plate 42 of triode 37B is connected to the junction of resistors 40 and 41, the resistor 41 being connected in parallel with a coupling capacitor 43 for applying pulses developed at the plate 42 to the grid 36. Cathodes 44 and 45 of triodes 38A and 38B, respectively, are connected directly together and through a resistor 46 to ground, the resistor 46 being shunted by a capacitor 47. The cathodes 44 and 45 are further connected through a parallel circuit comprising a resistor 48 and diode 49 to the cathodes of the diodes 34 and 35. The grid 37 of triode 38B is connected to the junction of resistors 50 and 51 connected in a series circuit comprising resistors 50, 51 and 52 connected between a source of plate voltage and ground, the resistor 50 having one end connected to ground, the resistor 52 having one end connected to the source of plate voltage, and the resistor 49 being shunted by a capacitor 53. Plate 54 of triode 37A is connected to the junction of resistors 51 and 52 and voltage pulses developed at the plate 54 are applied through the capacitor 53 to the grid 37 of triode 38B. The plate 54 of triode 37A is further connected through a diode 55 to a first output lead 56, the diode 55 having its cathode connected to the plate 52. The plate 42 of triode 37B is connected through a diode 58 to an output lead 59, the diode having its cathode connected to the plate 42. A flip-flop, being a bi-stable element, responds selectively to positive or negative impulses to flip the circuit from one state of conduction to the other. As hereinabove described the diodes 34 and 35 prevent a positive pulse, passed by the coupling capacitor 32 being applied to the grids 36 and 37 of the triodes 38A and 38B. Positive pulses appearing at the plates 42 and 54 are also incapable of causing the circuit to change its conductive state, because of the diodes 34, 35, and 49 and the bypass capacitor 47. Other than in respect to the provision of diodes 33, 34, and 47, the operation of the flip-flop circuit is conventional and upon the appearance of a negative impulse upon the grids 36 and 37, the tube which was initially conducting is rendered non-conductive and the tube which was originally non-conductive is rendered conductive. Resetting of the flip-flops to an initial condition, such as with tube 38B conducting, is accomplished by the application of negative pulse to a lead 60 connected through a diode 61 to grid 36 of tube 38A. As will appear in the detailed description of the overall circuit diagram of the binary to binary-decimal converter of the present invention, the diode 55 comprises one input diode of an and-gate having four inputs, one from each four adjacent flip-flops 2.

Figure 2:
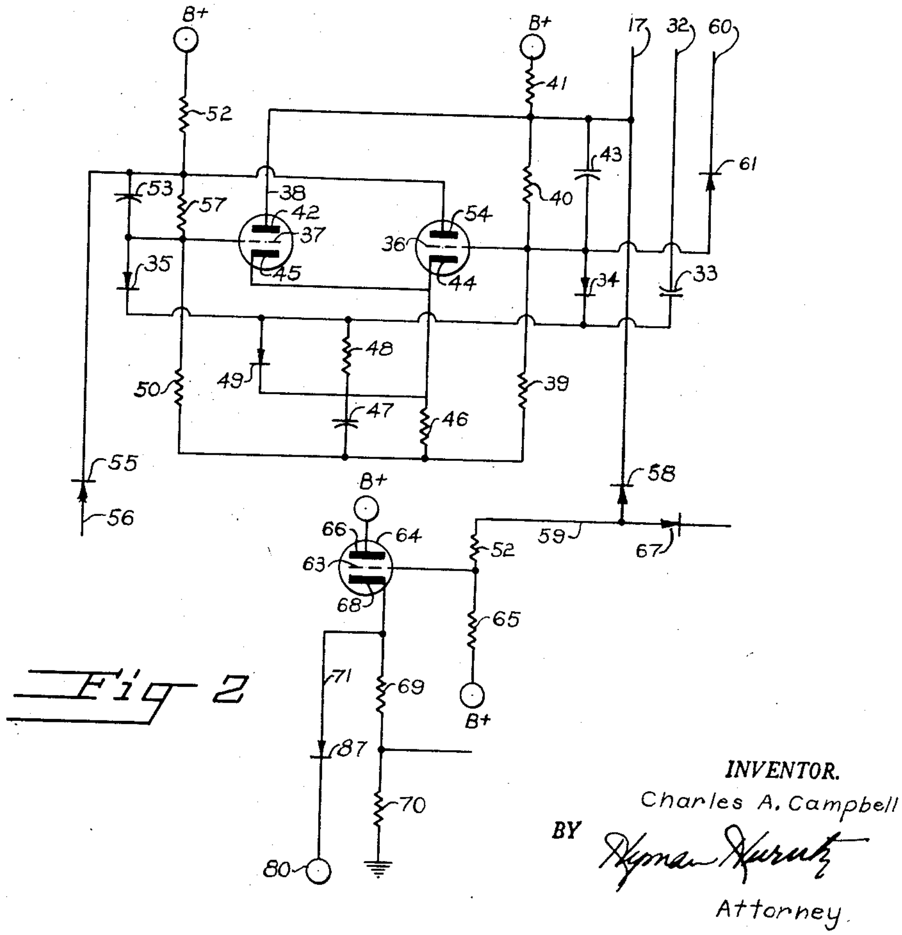
Figure 2 is a circuit diagram of a flip-flops and cathode follower circuits utilized in the converter.

Proceeding to the description of the cathode follower 3, and particularly to the cathode follower in the binary-decimal 2 position illustrated in Figure 2, the output lead 59 from flip-flop 2 is connected through a resistor 62 to a control grid 63 of a cathode follower 64, the grid 63 being also connected through a resistor 65 to a source of plate voltage. Plate 66 of the cathode follower 64 is directly connected to a source of plate voltage which is higher than the source of plate voltage to which the resistor 65 is connected. For purposes of illustration only, the source to which the resistor 65 is connected may provide a voltage of 210 volts and the plate voltage source supply for the plate may be 255 volts. The plate of the diode 58, in addition to being connected to the output lead 59, is also connected to the plate of diode 67 to form an inhibitor gate for purposes which will be explained during the description of operation of the complete converter of the present invention. Cathode 68 of cathode follower 64 is connected to a source of reference potential, such as ground, through series connected resistors 69 and 70, cathode 68 being connected to the resistor 69. The cathode 68 is further connected to a first output lead 71 and the junction of resistors 69 and 70 is connected to a second output lead 72. Separate output leads, 71 and 72, are utilized to provide one output signal on the lead 71, which may be utilized to drive subsequent equipment, and to provide on the lead 72 a signal for driving a visual indicating device, such as a neon tube. The cathode follower 64 is normally biased near cut-off when the tube 37B of the flip-flop 2 is conducting, since when the tube is conducting, the voltage drop across the resistor in the circuit of plate 42 of the tube maintains the cathode of the diode 58 negative, and current flow proceeds from the source of B+ for the triodes 38A and 38B through the resistor 41, diode 58, and resistors 62 and 65. Current flow through the tube and resistors 69 and 70 established a voltage on the cathode 68 relative to the voltage established on the grid 63 such that the cathode follower 64 is maintained in a state of partial conduction. When the triode 38B is rendered non-conductive, the voltage for the tubes 38A and 38B is applied to the cathode of the diode 58 and current flow through the diode and resistors 62 and 65 is terminated. As a result the control grid 63 of cathode follower 64 rises to the full B+ potential, and produces heavy conduction of the cathode follower 64 to produce positive output pulses on the leads 71 and 72 of sufficient magnitude to operate their respective loads.

Figure 3:
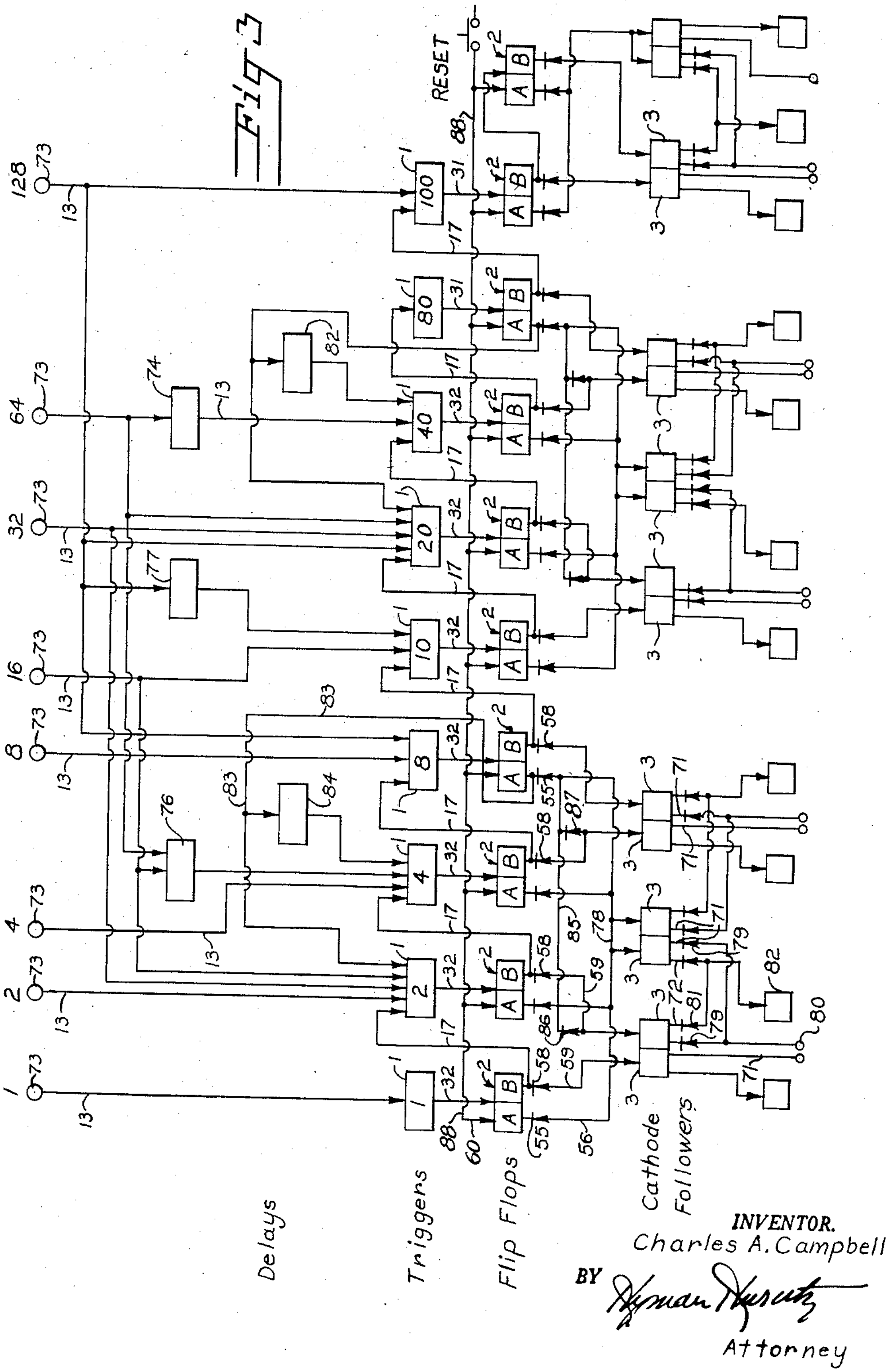
Figure 3 is a functional block diagram of the binary to binary-decimal converter of the present invention.

Referring to Figure 3 of the accompanying drawings, there is illustrated a block diagram of a binary to binary-decimal converter, capable of converting any binary number (in the range 0–255 expressed decimally) to its binary-decimal form. The apparatus is provided with a plurality of input terminals 73, the numerals 1, 2, 4, 8, 16, 32, 64 and 128 appearing above the respective terminals 73 indicating the binary number represented by the plus applied to that particular terminal. All of the terminals 73, except the one in the binary 64 position, are connected directly to the input leads 13 of the trigger circuits 1, the number in each of the rectangles representing the trigger circuits 1 indicating their weighted value in the binary-decimal system. The input terminal 73 receiving the pulse corresponding to the binary number 64 is connected through two microsecond delay line 74 to the input lead 13 of its respective trigger circuit 1. The input terminal 73 connected to receive the binary number 16 is further connected to an input lead of the trigger circuit 1 in the binary 2 position, and through a two microsecond delay line 76, to the input to trigger 1 in the binary 4 position. The input terminal 73 corresponding to the binary number 32 is further connected to an input circuit of the trigger 1 in the binary 2 position and through a two microsecond delay line 77 to an input circuit of the trigger 1 in the binary 16 position. The input terminal 73 which receives the binary number 64 is connected to an input circuit of the trigger 1 in the binary-decimal 20 or binary 32 position and through the two microsecond delay line 76 to the trigger 1 in the binary 4 position. The terminal 73 connected to receive binary number 128 is connected directly to input circuits of the triggers 1 which receive the binary 8 and binary 32 numbers. The output leads 32 of each of the trigger circuits 1 are connected as illustrated in Figure 2 to an input circuit of their respective flip-flops 2. The letters A and B in the two squares representing the flip-flop 2 in Figure 3 correspond to the A and B sections of the tubes 38A and 37B in Figure 2. The output lead 17 of each B section of the flip-flop 2 is connected to an input circuit of the trigger 1 associated with the next succeeding flip-flop 2 in the flip-flop chain. Each of the output leads 59 of the B section of the flip-flops 2 is connected to its respective cathode follower 3, the numbers appearing in the boxes representing the cathode followers 3 designating the binary-decimal number represented by the output device which the cathode followers 3 drive. The diodes 55 connected to the A sections of the flip-flops 2 are connected over their leads 56 to a common lead 78, which is connected in parallel to the input circuits of two cathode followers 3, designated binary-decimal 2 and 8. The four diodes 55 constitute an and-gate, i. e., a gate which maintains its associated cathode followers 3 in a state of low conduction unless all of the tubes 37A are non-conductive. If any one of the tubes 37A is conductive, current flows through resistors 62 and 65 and maintains the tube 64 in a state of low conduction. The purpose of the two additional cathode followers 3 in the binary decimal 2 and 8 positions will be explained subsequently. The output leads 71 connected in the output circuits of the pair of cathode followers 3 in the binary-decimal 2 position are each connected through a diode 79 to a common output terminal 80, so that upon energization of either of the cathode followers 2 an output voltage appears at the terminal 80. The second output leads 72 of the two cathode followers 3 which represent the binary decimal number 2 are connected through diodes 81 to an indicating device 82. A similar arrangement of interconnections is provided between the output leads 71 and 72 of the two cathode followers 3, representing each of the binary-decimal numbers 2, 8, 20, 80, 200, and 800. The plate 54 of the section 38A of the flip-flop 2 in the binary position 8 is connected over a lead 83 to the input of the two microsecond delay line 18, illustrated in Figure 1, to the trigger circuit 1 in the binary-decimal 4 position. Similarly, the plate of the tube 37A in the binary-decimal position 80 is connected through a two microsecond delay line 18 to the input circuit of the trigger 1 located in the binary-decimal position 40. The diode 55 associated with the flip-flops 2 in the binary-decimal positions 8 and 80 are connected over a lead 85 and through diodes 86 and 87 to the plates of the diodes 58, associated respectively with the flip-flops in the binary-decimal 2 and 20, and the 4 and 40 positions. The diodes 86 and 87 and associated diodes 58 constituted an inhibitor gate, so that when the A section of flip-flop 2 in the binary-decimal 8 position is conducting the cathode followers in the binary-decimal 2 and 4 positions are maintained at low conduction regardless of the condition of their associated flip-flops. To complete the circuit illustrated in Figure 3, each of the input leads 60 to the A sections of the flip-flops 2 is connected to a common lead 88, to which may be applied a negative pulse to reset the converter to its initial condition, which is that with all of the B sections of the flip-flops 2 conducting. In a binary-decimal representation of a multiple digit decimal number, each of the units, tens, hundreds, etc., digits are represented by a separate four unit binary number, whereas in the binary system all of the bits taken as a whole represent the number. For example, the number 128 is written in the binary code form as 0,10,00,00,00. When this same number is written in the binary decimal form, the 1 appears as a distinct four unit binary number having the form 0001. The two and eight are also written as distinct four bit numbers, and are respectively 0010 and 1000. Therefore, the first four bit binary number represents the 100's digit, the second binary number represents the 10's digit and the third binary number represents the units digit. The circuit of the present invention utilizes ten, serially connected or cascaded flip-flops 2 divided into groups 4, 4 and 2 for example, to provide a total available count of 400 of which 256 (0 through 255) are utilized. The first group of four flip-flops, or binary counters 2, register the numbers from zero to 15 in the binary system, while the register obtainable with the first and second and first, second and third groups respectively is 0 through 127 and 0 through 255. In a conventional binary chain, upon receipt of a pulse or a count, which conditions the flip-flops to a count equal to or greater than 16, the last flip-flop in the first scale-of-4 flip-flops 2 must provide an output or feedforward pulse to the first flip-flop in the next group of scale-of-four or two as the case may be. However, when converting to the binary-decimal form, the fourth flip-flop in the first scale-of-four must produce a feedforward pulse to the first flip-flop in the next scale-of-four upon the receipt of binary information equal to or greater than a count of 10. In order to accomplish this objective, in accordance with the present invention, a count of six is added to the binary number in each of the groups of four flip-flops. Thus, when a binary count of nine has been attained, the flip-flops are conditioned to represent a count of 15 so that upon the application of a pulse or group of pulses which carry the count of 10 or more, a feedforward pulse is applied to the next scale-of-four or two flip-flops 2. In accordance with the present invention, the false count of six is added to the binary count by a feedforward pulse appearing on the lead 83, which is developed by the A section of the flip-flop 2 in the binary-decimal 8 position and which is applied to the flip-flops in the binary-decimal 2 and 4 positions. The addition of a count of six upon receipt of a count equal to eight or greater causes the flip-flops 2 to represent the count received in each scale of four as six greater than that received. Therefore, some means must be provided for subtracting this count of six from the output of each scale-of-four, so that the binary number represented at the output terminals 80 is accurate. In accordance with the present invention, this is accomplished by the diodes 86, which apply inhibiting impulses to the output of the B sections of the flip-flops 2 in the binary-decimal positions 2 and 4 and 20 and 40. Since the converter, as illustrated, only counts to 255, this problem does not arise in the 100's chain of binary scaler. The application of inhibiting impulses to the output voltages of the A sections of the aforesaid flip-flops 2 in the 2 and 4 etc., binary-decimal positions effectively subtracts six from the output of the binary scalers and therefore reconverts the number to its original count.

The various delay lines are employed so that multiple input pulses and feedforward and feedback pulse in the flip-flop chain do not interfere with the summing logic of the converter. The time delay of the various delay lines is determined primarily by the time required by a flip-flop to accomplish a cycle of operation; that is, to change from one state to the other state of conduction. The delay times of the various delay lines in the specific embodiment of the invention described herein are based upon the utilization of flip-flops requiring a maximum of one-half a microsecond for a cycle of operation. The operation of the flip-flops is not symmetrical in that more time is required to convert from the A state of conduction to the B state than is required to convert from the B state to the A state, which produces a feedforward pulse. For the purposes of description only the time required for the latter change of states may be under one-tenth of a microsecond while the time required for the former change of states may be approximately one-half a microsecond, this latter interval determining the cycle time of the flip-flops. The interval between input pulses is also determined by the time required for a cycle of operation of a flip-flop taken in conjunction with the maximum number of operations; that is, interactions between the various flip-flops required of the converter for the conversion of a single number. The duration of each input pulse may be one-half a microsecond or less and the pulses are applied sequentially to the input terminals 73 at predetermined intervals starting with the terminal in the binary 128 position and terminating with the terminal in the binary 1 position. With the time required by a flip-flop to complete a cycle taken as one-half a microsecond, the maximum conversion time required for conversion of a number is, as will be demonstrated by example subsequently, approximately five microseconds and therefore the input pulses may be applied at five microsecond intervals. Since the converter is described as being able to convert an eight bit binary code, the total time required to convert the count requiring the most time, that being a count of 255, would appear to be forty microseconds. However, the addition of a count of one being fed in as the last digit, to a previously acquired count of 254, causes no feedforward of pulses and may be disregarded insofar as total time is concerned. Consequently, the total maximum time required for conversion is thirty-five microseconds, and the converter may operate at a rate of approximately 28 kilocycles per second. Inasmuch as the rate of 28 kilocycles is determined by the cycle time of each flip-flop, the rate may be materially increased as a result of reducing the flip-flop cycle time by employing special purpose tubes.

The operation of the converter of the present invention, particularly with respect to the summing and read-out logic, is described by employing a specific example wherein binary one is added to the converter during each successive input cycle. Subsequent examples will be employed to clarify the functions of the various delay lines.

The summing by one is described in conjunction with Table I, the first column of which is entitled "Input" and lists the numbers applied to terminals 73. The letter "D" followed by a number represents the delay of the pulse provided by the appropriate delay lines. The column entitled "Action" lists the successive operations of the flip-flops 2, the letters "F. B." indicating feedback or false count pulses and "on" and "off" indicating A and B states of conduction respectively of the flip-flops 2. Each row of this column represents one-half a microsecond and a dash in a row indicates no action during that interval. The column headed "State" indicates the states of conduction of the flip-flops 2 in the binary-decimal units chain, "1" indicating the A state of conduction. The column headed "Read Out" indicates the state of conductions of the cathode follower 3 and is divided into units and tens read out, a "1" indicating a high state of conduction of a cathode follower 3. The column headed "Total" indicates the initial and final counts represented by the voltages appearing at output terminals 80. Initially, all of the flip-flop 2's are in the

*Table I*

| Input | Action | State | Readout | | Total |
|---|---|---|---|---|---|
| | | | Units | Tens | |
| 0 | — | 0000 | 1010 | 0000 | 0 |
| 1 | 1 (on) | 0001 | 0001 | 0000 | 1 |
| 1 | 1 (off) | 0000 | | | |
| | 2 (on) | 0010 | 0010 | 0000 | 2 |
| 1 | 1 (on) | 0011 | 0011 | 0000 | 3 |
| 1 | 1 and 2 (off) | 0000 | | | |
| | 4 (on) | 0100 | 0100 | 0000 | 4 |
| 1 | 1 (on) | 0101 | 0101 | 0000 | 5 |
| 1 | 1 (off) | 0100 | | | |
| | 2 (on) | 0110 | 0110 | 0000 | 6 |
| 1 | 1 (on) | 0111 | 0111 | 0000 | 7 |
| 1 | 1, 2 and 4 (off) | 0000 | | | |
| | 8 (on) | 1000 | | | |
| | 2 (on) (F. B.) | 1010 | | | |
| | 4 (on) (D-3 F. B.) | 1110 | 1000 | 0000 | 8 |
| 1 | 1 (on) | 1111 | 1001 | 0000 | 9 |
| 1 | 1, 2 and 4 (off) | 1000 | | | |
| | 8 (off) | 0000 | | | |
| | 10 (on) | 0000 | 1010 | 0001 | 10 |

B state; that is, the tubes 38B are conducting, and all of the A sections are non-conducting. With all of the A sections of the flip-flops 2 non-conducting, all of the diodes 55 are rendered non-conductive, and the cathode followers 3 forming the divided rectangle having the numbers 2 and 8 therein are conducting to produce a read-out pattern wherein the 1 and 4 output terminals 80 have a low voltage appearing at them, while the output terminals 80 in the 2 and 8 position have a high voltage applied thereto. This arrangement provides a conventional IBM zero indication which reads 1010 and is the equivalent of 10. In the event that such a zero indication is not to be utilized, these two cathode followers and all of the diodes 53 except the one associated with the flip-flops in the binary-decimal 8 and 80 positions may be eliminated. Upon the application of a first pulse to the terminal 73 in the binary 1 position, the trigger circuit 1 applies a negative pulse to the flip-flop 2 and causes it to change to the A condition. The diode 58 is blocked causing the cathode follower 3 in the binary-decimal 1 position to become conductive and a positive voltage appears at the output 80 labeled 1. At the same time the diode 55 becomes conductive, the cathode followers 3 connected to the lead 78 are rendered partially conductive and the false zero indication is removed. Upon receipt of the next pulse at the terminal 73 in the binary 1 position, the flip-flop 2 is returned to the B or off position, and the conduction of the cathode follower 3 is reduced to remove the voltage from the terminal 80 indicative of a 1. When the flip-flop switches from the A to the B state, a negative pulse is applied over the output lead 17 to the trigger 1 in the binary 2 position. The trigger 1 applies a negative pulse to its associated flip-flop 2 and turns it on, this action being completed during the second half microsecond interval as a result of the delay of the flip-flop in changing from the B to A states of conduction. The diode 58 is blocked and the cathode follower 3 becomes highly conductive to provide an output voltage at the terminal 80 in the binary-decimal 2 position. Upon receipt of a third pulse indicative of a binary 1, the flip-flop 2 in the binary 1 position is turned on and an output appears at the terminal 80 in the binary-decimal 1 position giving a total count of 3. Upon receipt of the next pulse the flip-flop 2 in the binary 1 position is turned off producing a pulse on the lead 17, which turns off the flip-flop in the binary 2 position, which in turn applies a negative pulse to the trigger circuit in the binary 4 position to turn on the binary 4 flip-flop. These two flip-flops are both flipped during the first half microsecond interval due to the speed at which they flip from the A to B states of conduction. The conduction of the outputs is now a positive voltage at the binary-decimal 4 position and no voltage or low voltage indicative of zero at the binary-decimal 2 and 1 positions. Another input pulse turns on the flip-flop in the binary 1 position and the next pulse turns it off and turns on the flip-flop in the binary 2 position. Another pulse turns on the flip-flop in the binary 1 position, and now a positive voltage appears at the terminals 80 in the binary-decimal 4, 2, and 1 position which is indicative of a count of seven. It will be noted that to this point the action of the flip-flops 2 and the count registered by the flip-flops and registered at the output terminals 80 is the same as in a binary counter. However, upon receipt of the next binary 1 pulse, this condition is altered by the addition of six to the count registered by the flip-flops 2. Receipt of this pulse turns off the flip-flop in the binary 1 position, which turns off the flip-flop in the binary 2 position, which turns off the flip-flops in the binary 4 position, all of this occurring in about one-half microsecond. The output pulse appearing on the lead 17 from the binary-decimal 4 flip-flop turns on the binary 8 flip-flop. When the A section of the binary 8 flip-flop 2 becomes conductive a negative pulse is applied over the lead 83 to the trigger circuit 1 in the binary-decimal 2 position and turns on this flip-flop one-half microsecond after the binary 8 flip-flop was turned on. The negative pulse appearing on the lead 83 proceeds through the two microsecond delay line 18 to the trigger 1 in the binary-decimal 4 position, and turns on the flip-flop 2 in this position, the three dash lines between 2 (on) and 4 (on) indicating intervals during which no action of the flip-flops occurs. The count now registered by the first four binary scalers is 14, whereas the count actually applied to the apparatus is only 8. It is apparent, then, that the application of the native feedback pulse over the lead 83 adds a total of six to the count actually applied to the converter. At the same time, however, the pattern of output pulses at the leads 80 must still register a total of 8. This is accomplished by means of the inhibitor gates comprising the diodes 58, and 86 and 87 connected to the outputs of the flip-flops in the binary-decimal 2 and 4 positions, and the binary 8 position, respectively. When the A sections of the flip-flops in the binary 2 and 4 positions become conductive, the diodes 58 become non-conductive and the cathode followers in the binary 2 and 4 positions would normally become conductive and produce output counts. However, the diodes 86 and 87 are connected to the A section of the binary 8 flip-flop, and since the A section is conducting at this time, current flows through the diodes 86 and 87 and maintains the binary 2 and binary 4 cathodes in the non-conductive or partially conductive positions which indicate no output. As a result, although the binary-decimal 2 and 4 flip-flops are in the "on" condition, their outputs are inhibited, effectively subtracting six from the count registered by the flip-flops 2, thereby returning the number appearing at the output terminals 80 to the actual count applied to the input of the converter. Summarizing this operation, upon attainment of the count of eight in the first four binary scalers or flip-flops, a pulse is fed back to the binary 2 and 4 flip-flops to add six to the count registered by these flip-flops. On the other hand, a count of six is subtracted from the output of these flip-flops so as to maintain the state of voltages at the output terminals in the proper pattern for registering the count actually applied. The advancement of the state of the flip-flops by a count of six is necessary to cause the production of an output pulse from the binary 8 flip-flop to the decade flip-flops when a count of 10 is reached.

Proceeding with the description of the operation, the next input pulse, representing the ninth pulse applied, turns on the binary 1 flip-flop and a nine count appears at the output of the converter, as indicated by the pattern appearing in the Table I under "Read Out." The next pulse turns off the binary-decimal 1 flip-flop which turns off the binary-decimal 2 flip-flop, which turns off the binary-decimal 4 flip-flop, which in turn turns off the binary-decimal 8 flip-flop, producing an input pulse to the trigger circuit 1 in the binary-decimal position 10 (actually corresponding to the binary position 16). It will be noted that upon the application of the ninth input pulse, all of the flip-flops of the first four binary scalers were in the "on" condition, representing a count of 15 whereas the pattern of output pulses represented a count of 9. Upon the application of the tenth pulse, all of the first four binary flip-flops are turned off, the flip-flops in the 1, 2 and 4 positions being turned off during the first half microsecond interval and the flip-flop in the 8 position being turned off during the first position of the second half microsecond interval. The terminals 80 associated with the first four flip-flops now indicate zeros, and the fifth flip-flop in the chain is turned on, representing a count of 16 in the binary system, but in the binary-decimal system representing a count of 10. The same procedure of the addition of six, actually 60, is followed in the four binary scalers for producing the conversion of binary numbers greater than 15. An output from the A section of the flip-flop in the binary-decimal position 80 inhibits output from the B sections of the binary-decimal flip-flops in the 20 and 40 positions to subtract 60 from the pattern of outputs appearing at the binary 20 and 40 terminals 80.

The necessity for delay of five microseconds between application of input pulses to the converter and the necessity for the delay lines 18, 74, 76 and 77 becomes apparent upon consideration of the successive additions of a count of 16 to the converter. It will be noted that the terminals 73 in the binary 16, 32 and 64 positions are the only ones connected to supply two input pulses simultaneously to one decade of the converter. For example, a pulse applied to the binary 16 input terminal 73 is connected to the trigger circuits 1 in the binary-decimal 2 and 4 positions to achieve a count of six in the units decade. Consequently, the addition of a count of 16, 32 or 128 to the converter of the invention produces the most complex and time consuming operations to be performed and as a result determines the cyclic rate of operation of the converter previously described as 28 kilocycles for the purposes of explanation. The description hereinafter refers only to the addition of a count of 16 for purposes of example, and since the binary 16 terminal 73 supplies pulses to both the binary-decimal 2 and 4 trigger circuits 1, the delay line 76 is inserted in the input to the binary decimal trigger 4 to prevent the simultaneous appearance of a feedforward pulse from the binary-decimal 2 flip-flop and an input pulse at the binary-decimal 4 position. The delay line 18 is required to prevent the appearance at the binary-decimal 4 position of a feedback pulse from the binary-decimal 8 flip-flop simultaneously with a feedforward pulse resulting from a feedback pulse to the binary decimal 2 position. The occurrence of both of these situations becomes apparent upon reference to Table II which indicates the operation of the converter in adding by sixteens and in converting the total to binary-decimal form. The table is arranged the same as Table I, the operation of the tens decade of counter not being tabulated, since it is of no interest with respect to the sequence in the units decade. However, the final count of the tens decade at the end of each count is indicated in the Read-Out; Tens Column.

Referring specifically to Table II, a count of sixteen is applied to the appropriate terminal 73 and the count of two plus four is applied to the units decade converter. The flip-flop in the binary decimal 2 position is turned on and after a total delay of two microseconds, during which the pulse proceeds through the delay line 18, the flip-flop in the binary 4 position is turned on, producing a count of six in the units decade and a total count of sixteen in the converter. Upon the application of a second pulse to the terminal 73 in the binary 16 position, the pulse routed to the binary-decimal 2 flip-flop turns off this flip-flop and produces a feedforward pulse which turns off the binary-decimal 4 flip-flop in the same half microsecond interval. The binary decimal 8 flip-flop is turned on in the next half microsecond interval and produces a feedback pulse which turns on the binary-decimal 2 flip-flop in the third half microsecond interval. During the next half microsecond interval, or two full microseconds after the input pulse was applied to terminal 73, a pulse appears on the input lead to the binary-decimal 4 trigger and turns its associated flip-flop on. After another full microsecond or a total of two microseconds after the flip-flop 8 was turned on, the flip-flop in the binary-decimal 4 position is turned off by the feedback pulse developed by the binary-decimal 8 flip-flop. The turning off of the binary-decimal 4 flip-flop turns off the binary decimal 8 flip-flop and a final count of two is registered in the units decade of the converter. It will be noted from the second sequence that if the delay line 76 were not provided, the feedforward pulse to the binary 4 position, resulting from the turning off of the binary 2 position in response to receipt of its input pulse, would appear at the input to the binary decimal 4 trigger at the same time that the input pulse to that trigger. Consequently, delay line 76 provides a suitable delay between the application of these two pulses.

*Table II*

| Input | Action | State | Readout | | Total |
|---|---|---|---|---|---|
| | | | Units | Tens | |
| 0 | — | 0000 | 1010 | 0000 | 0 |
| 2 and 4 (D-2) | 2 (on) | 0010 | | | |
| | — | 0010 | | | |
| | — | 0010 | | | |
| | 4 (on) | 0110 | 0110 | 0001 | 16 |
| 2 and 4 (D-2) | 2 and 4 (off) | 0000 | | | |
| | 8 (on) | 1000 | | | |
| | 2 (on) | 1010 | | | |
| | 4 (on) | 1110 | | | |
| | — | 1110 | | | |
| | — | 1110 | | | |
| | 4 (off) and 8 (off) | 0010 | 0010 | 0011 | 32 |
| | — | 0100 | 0100 | 0110 | 64 |
| 2 and 4 (D-2) | 2 (on) | 0110 | | | |
| | — | 0110 | | | |
| | — | 0110 | | | |
| | — | 0110 | | | |
| | 4 (off) | 0010 | | | |
| | 8 (on) 2 (off) 4 (on) | 1100 | | | |
| | — | 1100 | | | |
| | — | 1100 | | | |
| | — | 1100 | | | |
| | 4 (off) 8 (off) | 0000 | 1010 | 1000 | 80 |

The cyclic operation of the converter continues with the addition of each count of sixteen and the next cycle of operation displayed in Table II is illustrated as occurring after the converter has accumulated a total count of 64. Upon the application of the next count of sixteen, the binary decimal 2 flip-flop is turned on, and after a two microsecond delay, the binary decimal 4 flip-flop is turned off. A half microsecond later, the binary 8 flip-flop is turned on and during the same half microsecond interval, the binary 2 flip-flop is turned off as a result of the feedback pulse developed on the lead 83. The turning off of the binary decimal 2 flip-flop turns on the binary decimal 4 flip-flop and after a delay of an additional one and a half microseconds, the binary 4 flip-flop is turned off as a result of the feedback pulse developed on the lead 83 by the binary decimal 8 flip-flop. Turning off of the binary decimal 4 flip-flop turns off the binary decimal 8 flip-flop and the units decade registers a count of zero which in the May code is read as a count of 10. It will be noted that if the two microsecond delay lines 18 were not utilized, the turning on of the binary decimal 8 flip-flop in the two and a half microsecond interval, a feedback pulse would appear at the 2 and 4 binary-decimal flip-flops simultaneously. Since the binary 2 flip-flop was initially on and is turned off by this pulse, it produces a feedforward pulse to the binary decimal 4 flip-flop which would occur simultaneously with the feedback pulse at this latter flip-flop. The utilization of the delay line 18 delays the feedback pulse to the binary decimal 4 flip-flop sufficiently to prevent an interaction between these two pulses. The operation of the internal circuitry of the converter during this last described interval took a total elapsed time of approximately five microseconds and represents the maximum time required for any cycle of operation of the converter. The purpose of the delay line 18 connected in the input circuit of the binary decimal 40 flip-flops serves the same purpose as the delay line 18 connected in the input circuit to the binary decimal 4 flip-flop and the delay line 77 serves the same purpose as the delay line 76 in preventing interaction between pulses applied to the binary decimal 10 and 20 flip-flops developed initially at the terminal 73 in the binary 128 position. Similarly, the delay line 74 connected in the input circuit to the binary decimal 40 flip-flop serves to separate the pulses applied to the binary-decimal 20 and 40 flip-flops which receive pulses from the terminal 73 in the binary-decimal 64 position.

The operation of the converter of the present invention depends upon a feedforward of pulses through the binary chain, and a feedback of pulses from the binary 8 flip-flop 2 to insert a count of six into each group of binary scalers to cause the production of a transfer pulse between the distinct groups of four binary scalers when a count of ten is obtained. The inhibition of output indications by the diodes 86 and 87 connected to the output of the A state of the binary 8 flip-flop subtracts the six count added to the state of the flip-flops, so that the binary decimal output corresponds with the count applied to the input terminals 73. The additional cathode followers 3 for the two and eight count provide a false zero count of the type utilized in the "IBM" code, i. e., instead of the zero reading being four consecutive binary zeros, the zero reading is a count of 10. However, by the removal of these two additional cathode followers 3, and elimination of the diodes 55 associated with the flip-flops in the binary 4, 2, and 1 stages, a true binary-decimal zero may be obtained. The same holds for the decade group of binary scalers represented by the 10, 20, 40 and 80 cathode followers 3. The additional 200 and 800 cathode followers 3 in the binary-decimal 100's group of flip-flops 2 provide the "IBM" type false zero indication for the 100's scaler. Again, by the elimination of the additional 200 cathode follower 3 and the 800 cathode follower 3, a true zero indication may be obtained from the 100's units.

It is apparent that a conventional binary counter has been converted to a binary-decimal counter and converter by the utilization of false counts, in this particular application, a false count of six being added. The same principle may be applied for the conversion of codes other than binary code to other types of codes than binary-decimal, by the insertion of appropriate false counts. Thus, instead of a binary to binary-decimal conversion wherein transfer of a pulse from the first four binary scalers to the second four binary scalers occurs at a count of ten, it may be desirable to provide an output code wherein such a transfer occurs at the count of nine. In such a converter, the line 83 from the A section of the binary 8 flip-flop 2 would feedback to the 1, 2, and 4 triggers of the 1, 2, and 4 binary flip-flops to add a count of seven and the output from the A section of the binary 8 flip-flop 2 would apply an inhibiting pulse to the outputs of the B sections of the binary-decimal 1, 2, and 4 flip-flops 2 to subtract nine from the state indicated by the flip-flops 2.

While I have described and illustrated my invention as embodied in a specific structure, variations of the details and general arrangement may be resorted to without departing from the true spirit and scope of the invention as defined in the appended claims.

What I claim is:

1. A converter for converting binary coded input information to individually binary-coded numbers of other base number systems, comprising a plurality of bi-stable circuit elements connected in a cascaded circuit, means for coupling the individual elements of the binary coded input information, to preselected bi-stable elements, each element of said binary code being coupled to an integral number of bi-stable elements, including one, having a total weight in the cascaded circuit equal to the weight of the element in the binary code, means for adding a false count to said cascaded circuit equal to the difference between the count in the binary system and the count in a selected other base number system necessary to produce a transfer count from a preselected one of said bi-stable circuit elements to the next succeeding bi-stable element, said means for adding including means for feeding back a signal from said one bi-stable element to preceding bi-stable elements whose total weight in the cascaded circuit is equal to the false count, means for sensing the count represented by said bi-stable elements, said means for sensing including means for subtracting the false count from the count represented by said bi-stable elements, and delay means for preventing interaction between input information, false counts and transfer counts.

2. The combination in accordance with claim 1 wherein said other base number system is the decimal system and wherein said one bi-stable element is in the binary-decimal eight position and said preceding bi-stable elements are in the binary-decimal two and four positions.

3. The combination in accordance with claim 2 wherein said means for subtracting comprises inhibitor gate means connected to receive coded information from said bi-stable circuit elements in the binary-decimal two and four positions and to receive inhibiting signals from said one bi-stable circuit element.

4. The combination in accordance with claim 1 wherein each of said means for coupling comprises a trigger circuit, and wherein the transfer count from each of said bi-stable circuit elements is coupled to its next succeeding bi-stable element through said trigger circuits, said trigger circuits having means for passing signals of only one polarity.

5. The combination in accordance with claim 1 wherein said means for coupling comprises a plurality of trigger circuits having a plurality of input circuits and an output circuit, said bi-stable circuit elements having at least one input circuit, and one output circuit, means for coupling said output circuit of each of said trigger circuits to said one input circuit of a different one of said bi-stable circuit elements.

6. The combination in accordance with claim 1 wherein said sensing means includes means for producing a false zero indication equal to the base number of said selected other base number system.

7. The combination in accordance with claim 1 wherein said means for sensing comprises a plurality of cathode followers, and means for causing said cathode followers to assume respective states of conduction indicative of the true count applied to said bi-stable circuit elements.

8. A converter for converting binary coded information to individually binary-coded numbers of other base number systems, comprising a plurality of bi-stable circuit elements connected in a cascaded circuit, means for coupling the individual elements of the binary coded information to preselected bi-stable elements, each element of said binary code being coupled to an integral number of bi-stable elements, including one, having a total weight in the cascaded circuit equal to the weight of the element in the binary code, means for adding false counts, to said cascaded circuit equal to the difference between the count in the binary system and the count in a selecter other base number system necessary to produce a transfer of counts from certain of said bi-stable circuit elements to the next succeeding bi-stable elements, said means for adding including means for feeding back a signal from said certain bi-stable elements to preceding bi-stable elements whose total weight in the cascaded circuit is equal to the total of the false counts, means for sensing the count represented by said bi-stable elements, said means for sensing including means for subtracting the false counts from the count represented by said bi-stable elements, and delay means for preventing interaction between input information, false counts and transfer counts.

9. A converter for converting binary coded signals to individually binary coded numbers of another base number system, comprising a plurality of bi-stable circuit elements having a first and second state of conduction and adopted to produce a transfer signal when changing from either of the states of conduction to the other state of conduction, a plurality of trigger circuits, means for coupling the transfer signal from each said bi-stable circuit element produced when changing from the first to the second state of conduction to its next succeeding bi-stable circuit element through a different one of said trigger circuits, means for coupling the individual elements of the binary coded signals, to preselected bi-stable circuit elements through said trigger circuits, each element of said binary code signal being coupled to an integral number of bi-stable circuit elements, including one, having a total weight in the cascaded circuit equal to the weight of the element in the binary code, means for adding a false count to said cascaded circuit equal to the difference between the count in the binary system and the count in said other base number system necessary to produce a transfer signal between a preselected one of said bi-stable circuit elements to the next succeeding bi-stable circuit element, said means for adding including means for feeding back through said trigger circuits a transfer signal, produced when said one bi-stable circuit element changes from the second to the first state of conduction, to preceding bi-stable circuit elements whose total weight in the cascaded circuit is equal to the false count, means for sensing the count represented by said bi-stable elements, said means for sensing including means for subtracting the false count from the count represented by said bi-stable elements, and delay means for preventing interaction between input information false counts and transfer counts.

10. The combination in accordance with claim 9 wherein said means for subtracting includes inhibitor gate means each having two input circuits, means coupling one input circuit of each of said inhibitor gate means to receive a signal from said one bi-stable circuit element when the first state of conduction and means for connecting the other input circuit of each of said inhibitor gate means respectively to receive signals from said preceding bi-stable circuit elements when in the first state of conduction.

11. The combination in accordance with claim 9 wherein said means for sensing comprises a plurality of cathode followers, means for connecting each of said cathode followers to sense the state of conduction of a different one of said bi-stable circuit element, and means for causing said cathode followers to assume a state of conduction indicating a binary one when said bi-stable circuit elements are in the first state of conduction, said last mentioned means including inhibitor means for causing said cathode followers associated with said preceding bi-stable circuit elements to assume a state of conducton indicating a binary zero when said one bi-stable element is in said first state of conduction regardless of the state of conduction of said preceding bi-stable elements.

12. The combination in accordance with claim 11 including further cathode followers, and means for causing said further cathode followers to assume states of conduction corresponding to the binary indication of the base number of said other base number system when all said bi-stable circuit elements are in the second state of conduction.

References Cited in the file of this patent

UNITED STATES PATENTS

| | | |
|---|---|---|
| 2,671,171 | Rench | Mar. 2, 1954 |
| 2,690,303 | Nolde | Sept. 28, 1954 |
| 2,691,100 | Moody | Oct. 5, 1954 |
| 2,697,549 | Hobbs | Dec. 21, 1954 |
| 2,719,670 | Jacobs | Oct. 4, 1955 |
| 2,756,934 | Ziffer | July 31, 1956 |
| 2,762,915 | Bagley | Sept. 11, 1956 |
| 2,770,415 | Lindesmith | Nov. 13, 1956 |